(No Model.) 2 Sheets—Sheet 1.

J. R. PARKS & J. KIMBALL.
TWO WHEELED VEHICLE.

No. 409,422. Patented Aug. 20, 1889.

WITNESSES:
F. McArdle.
C. Sedgwick

INVENTOR:
J. R. Parks
BY J. Kimball
Munn & Co.
ATTORNEYS.

(No Model.)  2 Sheets—Sheet 2.

J. R. PARKS & J. KIMBALL.
TWO WHEELED VEHICLE.

No. 409,422.  Patented Aug. 20, 1889.

WITNESSES:
F. McArdle
C. Sedgwick

INVENTOR:
J. R. Parks
J. Kimball
BY Munn & Co.
ATTORNEYS.

UNITED STATES PATENT OFFICE.

JAMES R. PARKS AND JESSE KIMBALL, OF NEW MADRID, MISSOURI.

TWO-WHEELED VEHICLE.

SPECIFICATION forming part of Letters Patent No. 409,422, dated August 20, 1889.

Application filed May 21, 1889. Serial No. 311,528. (No model.)

*To all whom it may concern:*

Be it known that we, JAMES ROBERT PARKS and JESSE KIMBALL, both of New Madrid, in the county of New Madrid and State of Missouri, have invented a new and useful Improvement in Two-Wheeled Vehicles, of which the following is a full, clear, and exact description.

Our invention relates to an improvement in two-wheeled vehicles, and has for its object to provide a vehicle of this type of simple and durable construction, and also to provide a vehicle in which the horse motion will not be felt.

The invention has for its further object to provide a means whereby the seat may be adjusted to accommodate riders of different weights.

The invention consists of the novel construction and combination of the several parts, as will be hereinafter more fully set forth, and pointed out in the claims.

Reference is to be had to the accompanying drawings, forming a part of this specification, in which similar figures of reference indicate corresponding parts in all the views.

Figure 1:
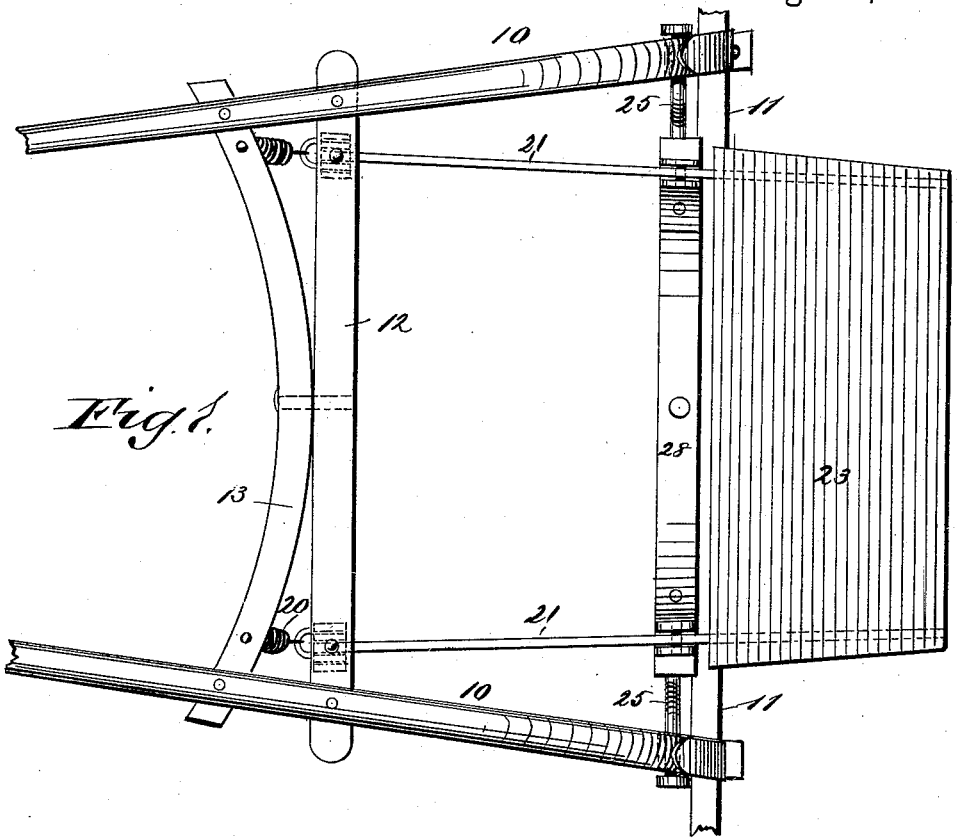
Figure 2:
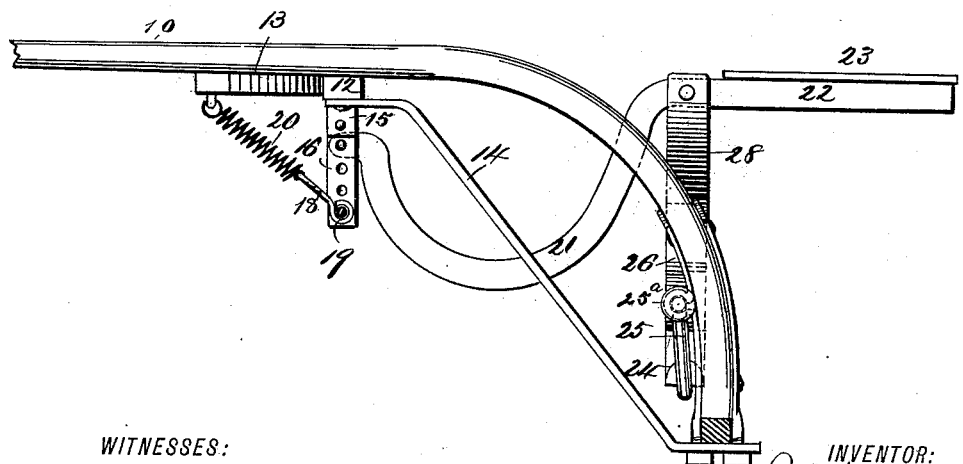
Figure 3:
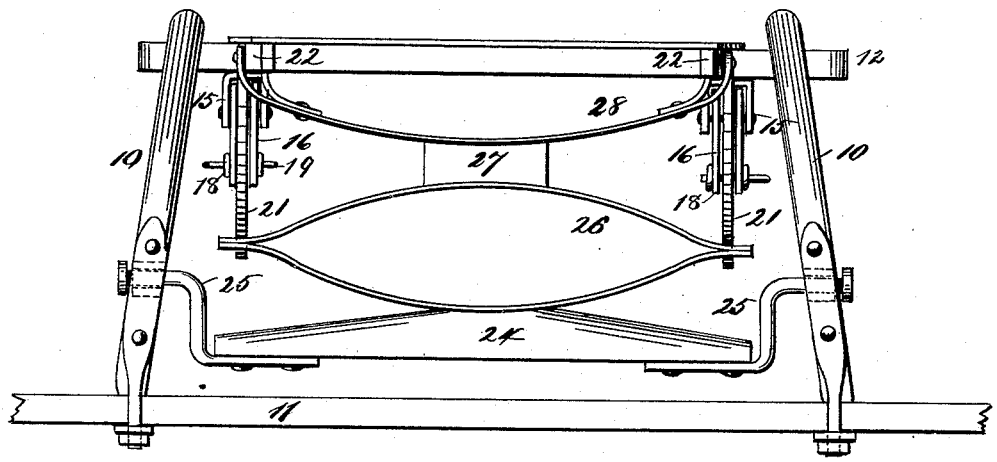

Figure 1 is a plan view of the vehicle, the thills being broken away. Fig. 2 is a side elevation of the same, partly in section. Fig. 3 is a rear elevation, and Figs. 4 and 5 are detail views illustrating the adjustable connection of the seat-supports.

The thills 10 are curved downward at the rear and clipped to the axle 11 in any suitable or approved manner. The thills are united a suitable distance between the center and the rear by a cross-bar 12 and also by a curved brace-bar 13, the two bars being preferably connected at the center by a bolt. The curved bar is located in front of the straight bar 12, as best illustrated in Fig. 1.

From the under side of the transverse thill-bar 12, near each end, a brace bar or rod 14 is projected downward beneath the axle, and through the rear end of the said bars 14 the axle-clips are passed. The brace-bars 14, however, may be constructed in a different manner than that illustrated without departing from the spirit of the invention.

Figure 4:
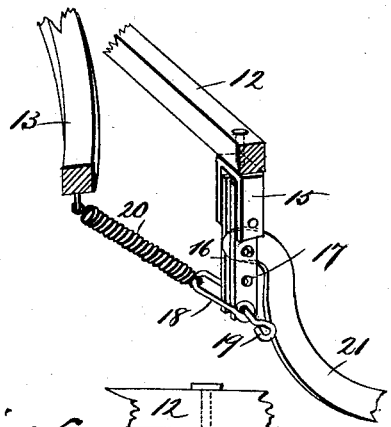
Figure 5:
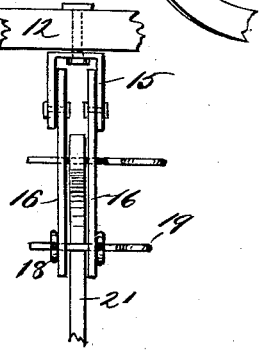

To the under face of the cross-bar 12, near each end and within the thills, a bracket 15 is secured, preferably U-shaped, and adapted to extend perpendicularly downward, as illustrated in Figs. 4 and 5.

Within each bracket 15 and to the respective members thereof perpendicular plates 16 are secured, which plates are provided with a series of longitudinally-arranged apertures 17, and in the arrangement of the plates within the brackets one plate is pivoted to each member of the latter, and the apertures in each pair of plates are in transverse alignment. A link 18 is attached to the lower extremity of each pair of apertured plates 16 by passing a pin 19 or equivalent device through the link and through the bottom apertures of the plate, as illustrated in Fig. 4. To facilitate the passage of the pin 19 an eye is preferably formed on the links at each side of the same. The forward end of each link 18 is attached to the under side of the curved thill-bar 13 by a spring 20, which spring is preferably a coil or spiral spring, as shown.

Between each pair of apertured plates 16 the inner ends of the seat-supporting bars 21 are pivoted. These bars are curved downward from their pivotal point, and upward over and beyond the axle, as shown at 22 in Fig. 2. To the horizontal rearwardly-extending section of the bars 21 any suitable form of seat 23 is rigidly secured. It is obvious from this construction that the inclination of the seat may be varied at will by raising or lowering the pivotal point of the seat-bars, thus throwing the seat upward or downward, as may be demanded by the weight of the rider. It will be further observed that by reason of the spring 20 and the pivotal connection of the plate with the seat-bars a lateral spring movement is imparted to the seat proper.

Another improvement in the construction of the vehicle consists in the manner of supporting the seat-bars at the rear. This support consists primarily of what might be termed a "bolster" 24, having attached at each end a crank-arm 25, which crank-arms are held to turn, respectively, in bearings 25ª, formed upon the inner member of the axle-clips, as illustrated in Figs. 2 and 3. Upon this rocking bolster 24 an elliptical spring 26 is secured in any approved manner, or the said elliptical spring may be substituted by a spring of equivalent construction. Upon the spring 26 a head-block 27 is attached, and to the said head-block a semi-elliptical spring 28 is rigidly fastened, the ends of which spring are secured to the horizontal section of the respective seat-bars 21, as best illustrated in Fig. 3.

It is evident from the foregoing description that as the seat is supported upon springs capable of flexing vertically, the said springs being attached to a bolster capable of rocking, and, in addition to this construction, that the forward end of the seat-bars is secured in bearings controlled by springs capable of flexing laterally, the rider, when driving in a vehicle, cannot under any possibility be subjected to what is ordinarily termed the "horse motion." That this motion is effectually avoided in the construction of the vehicle above described is obvious from the fact that the seat is essentially independent of the axle.

Having thus described our invention, we claim as new and desire to secure by Letters Patent—

1. In a two-wheeled vehicle, the combination, with the thills and their cross-bars, of a bracket attached to one of the cross-bars near each end, apertured plates pivoted in said brackets, a spring connecting the plates and the forward thill cross-bar, and a curved seat-support pivoted at one end between the apertured plates and spring-supported near the opposite end, substantially as shown and described.

2. In a two-wheeled vehicle, the combination, with the thills and cross-bars connecting the same, apertured perpendicular plates pivoted in pairs beneath the rear cross-bar of the thills, and a spring connecting each pair of plates with the forward cross-bar, of seat-supports, each comprising a forward curved section and a rearward horizontal section, the extremities of the forward curved sections being respectively pivoted between the apertured plates, and springs supported between the thills and attached to the horizontal section of each seat-bar, substantially as shown and described.

3. In a two-wheeled vehicle, the combination, with the thills, the axle, the thill cross-bars, seat-bars adjustably pivoted at their forward ends to the rear thill-bar, and springs connecting the pivotal support of the seat-bars and the forward thill-bar, of a rocking bolster and springs secured to the said bolster and to the rear portion of the seat-bars, substantially as shown and described.

4. In a two-wheeled vehicle, the combination, with the thills, the axle, the thill-bars, and seat-bars adjustably secured at their forward ends to the thill-bars, of a rocking bolster and springs attached to the said bolster and to the rear portion of the seat-bars, all combined for operation substantially as shown and described.

5. In a two-wheeled vehicle, the combination, with the thills and the thill cross-bars, of apertured plates pivoted in pairs near each end of one thill cross-bar, springs connecting each pair of plates with the forward thill cross-bar, and seat-supporting bars adjustably pivoted at their inner ends between the several pairs of apertured plates, substantially as and for the purpose specified.

JAMES R. PARKS.
JESSE KIMBALL.

Witnesses:
T. I. FONTAINE,
R. J. WATERS.